(12) United States Patent
Suzuki et al.

(10) Patent No.: US 11,362,322 B2
(45) Date of Patent: Jun. 14, 2022

(54) LITHIUM SECONDARY BATTERY

(71) Applicant: Panasonic Intellectual Property Management Co., Ltd., Osaka (JP)

(72) Inventors: Hirotetsu Suzuki, Osaka (JP); Akira Kano, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 204 days.

(21) Appl. No.: 16/410,522

(22) Filed: May 13, 2019

(65) Prior Publication Data

US 2019/0379035 A1 Dec. 12, 2019

(30) Foreign Application Priority Data

Jun. 7, 2018 (JP) .............................. JP2018-109775

(51) Int. Cl.
*H01M 4/134* (2010.01)
*H01M 4/38* (2006.01)
(Continued)

(52) U.S. Cl.
CPC ........... *H01M 4/134* (2013.01); *H01M 4/382* (2013.01); *H01M 4/622* (2013.01);
(Continued)

(58) Field of Classification Search
CPC ...... H01M 4/134; H01M 4/382; H01M 4/622; H01M 10/0525; H01M 10/0567;
(Continued)

(56) References Cited

U.S. PATENT DOCUMENTS

| | | | | |
|---|---|---|---|---|
| 6,566,015 B1 * | 5/2003 | Yamada | ............. | C07D 295/023 |
| | | | | 429/326 |
| 2009/0004569 A1 * | 1/2009 | Yamamoto | ............ | C01B 32/205 |
| | | | | 429/231.8 |

(Continued)

FOREIGN PATENT DOCUMENTS

| | | |
|---|---|---|
| EP | 1039570 A1 | 9/2000 |
| JP | 7-249432 A | 9/1995 |

(Continued)

OTHER PUBLICATIONS

English Translation of JP2001243957.*
The Extended European Search Report dated Aug. 19, 2019 for the related European Patent Application No. 19173709.7.

*Primary Examiner* — Kiran Quraishi Akhtar (74) *Attorney, Agent, or Firm* — McDermott Will & Emery LLP (57) ABSTRACT

Provided is a lithium secondary battery comprising a cathode, an anode, and a non-aqueous electrolyte having lithium ion conductivity. A lithium metal is precipitated on a surface of the anode during charge of the lithium secondary battery. The lithium metal is dissolved from the surface of the anode in the non-aqueous electrolyte during discharge of the lithium secondary battery. The non-aqueous electrolyte contains a solvent and a lithium salt. The solvent includes a (Continued)

fluorinated ether. The fluorinated ether has a fluorination ratio of more than 0% and not more than 60%.

6 Claims, 2 Drawing Sheets

(51) Int. Cl.
*H01M 4/62* (2006.01)
*H01M 10/0525* (2010.01)
*H01M 10/0567* (2010.01)
*H01M 10/0568* (2010.01)
*H01M 4/02* (2006.01)

(52) U.S. Cl.
CPC ... *H01M 10/0525* (2013.01); *H01M 10/0567* (2013.01); *H01M 10/0568* (2013.01); *H01M 2004/027* (2013.01); *H01M 2300/0034* (2013.01)

(58) Field of Classification Search
CPC ......... H01M 10/0568; H01M 10/0569; H01M 10/052; H01M 2004/027; H01M 2300/0034; Y02E 60/10
See application file for complete search history.

(56) References Cited

U.S. PATENT DOCUMENTS

| | | | |
|---|---|---|---|
| 2011/0300453 A1 | 12/2011 | Kotato et al. | |
| 2013/0065136 A1* | 3/2013 | Sasaki | H01M 4/505 |
| | | | 429/332 |
| 2015/0004501 A1* | 1/2015 | Koh | H01M 4/505 |
| | | | 429/338 |
| 2016/0301065 A1* | 10/2016 | Sakai | H01M 4/505 |

FOREIGN PATENT DOCUMENTS

| | | | | |
|---|---|---|---|---|
| JP | 8-037024 | | 2/1996 | |
| JP | 11-238517 A | | 8/1999 | |
| JP | 2001-243957 | | 9/2001 | |
| JP | 2001243957 | * | 9/2001 | ............ Y02E 60/10 |
| JP | 2006-114388 | | 4/2006 | |
| JP | 2009-259472 | | 11/2009 | |
| JP | 2014-060143 A | | 4/2014 | |
| JP | 2014-067593 A | | 4/2014 | |
| JP | 2017-059367 | | 3/2017 | |
| WO | 2000/016427 A1 | | 3/2000 | |
| WO | 2011/162169 A1 | | 12/2011 | |

* cited by examiner

LITHIUM SECONDARY BATTERY

BACKGROUND

1. Technical Field

The present disclosure relates to a lithium secondary battery in which a lithium metal is used as an anode active material. More specifically, the present disclosure relates to improvement of a non-aqueous electrolyte in the lithium secondary battery.

2. Description of the Related Art

In the lithium secondary battery, a lithium metal is precipitated on the anode thereof during the charge. On the other hand, during the discharge, the lithium metal is dissolved in a non-aqueous electrolyte.

Patent Literature 1 discloses adding a nitrile compound to a non-aqueous electrolyte to improve a battery characteristic such as a cycle characteristic in a lithium ion battery. On the other hand, in the lithium secondary battery, a lithium metal is precipitated on the anode during the charge. Since the lithium metal has a high reduction ability, a side reaction occurs easily between the lithium metal and the non-aqueous electrolyte. As a result, the cycle characteristic is easily lowered. Patent Literature 2 discloses a lithium secondary battery comprising a non-aqueous electrolyte provided by dissolving a lithium salt in a solvent such as ethylene carbonate or diethyl carbonate.

CITATION LIST

Patent Literature

[Patent Literature 1] Japanese Patent Application Publication No. 2009-259472
[Patent Literature 2] Japanese Patent Application Publication No. 2001-243957
[Patent Literature 3] Japanese Patent Application Publication No. 2006-114388
[Patent Literature 4] Japanese Patent Application Publication No. 2017-059367
[Patent Literature 5] Japanese Patent Application Publication No. Hei 8-37024

SUMMARY

The present disclosure provides a lithium secondary battery excellent in a cycle characteristic.

The lithium secondary battery according to the present disclosure comprises:
 a cathode;
 an anode; and
 a non-aqueous electrolyte having lithium ion conductivity,
 wherein
 a lithium metal is precipitated on a surface of the anode during charge of the lithium secondary battery;
 the lithium metal is dissolved from the surface of the anode in the non-aqueous electrolyte during discharge of the lithium secondary battery;
 the non-aqueous electrolyte contains a solvent and a lithium salt;
 the solvent includes a fluorinated ether; and
 the fluorinated ether has a fluorination ratio of more than 0% and not more than 60%.

The lithium secondary battery according to the present disclosure is excellent in a cycle characteristic.

DETAILED DESCRIPTION OF THE EMBODIMENT

Hereinafter, the lithium secondary battery according to the embodiment according to the present disclosure will be described with reference to the drawings. The lithium secondary battery according to the embodiment comprises a cathode, an anode, and a non-aqueous electrolyte having lithium ion conductivity.

(Non-Aqueous Electrolyte)

The non-aqueous electrolyte has lithium ion conductivity. The non-aqueous electrolyte contains a lithium salt and a solvent. As the solvent, a non-aqueous solvent is used. The lithium salt is composed of a lithium ion and an anion. The lithium salt dissolves in the solvent. Typically, the lithium salt dissociates in the non-aqueous electrolytes and is present as a lithium ion and an anion. Typically, the non-aqueous electrolyte is liquid or gel.

The lithium salt is dissolved in the non-aqueous solvent to prepare the liquid non-aqueous electrolyte. The lithium salt is dissolved in the non-aqueous solvent to generate lithium ions and anions; however, the non-aqueous electrolyte may contain an undissociated lithium salt.

The gel non-aqueous electrolyte may contain the liquid non-aqueous electrolyte and a matrix polymer. An example of the matrix polymer is a polymer material which serves as a thickener by absorbing the non-aqueous solvent. An example of the polymer material is a fluoric resin, an acrylic resin, or a polyether resin.

(Solvent)

One of the characteristics of the lithium secondary battery according to the present embodiment is that the solvent contained in the non-aqueous electrolyte includes fluorinated ether having a fluorination ratio of not more than 60%. The solvent including the fluorinated ether is used to allow a charge-discharge reaction on a surface of the anode of the lithium secondary battery to further proceed uniformly. Besides, such a solvent prevents a dendrite formed of the lithium metal from being generated. As a result, the cycle characteristic is prevented from being lowered. The non-aqueous solvent may contain a solvent other than the fluorinated ether.

In the present specification, the fluorination ratio is defined as below.

(Fluorination Ratio)=(the number of the fluorine atom(s) included in one fluorinated ether)/(the sum of the numbers of the fluorine atom(s) and the hydrogen atom(s) included in the one fluorinated ether).

For example, the fluorination ratio of the fluorinated ether represented by the chemical formula $CF_3CH_2OCH_2CH_2OCH_3$, which is used in the inventive example 1 which will be described later, is calculated as below.

The number of the fluorine atoms included in the fluorinated ether represented by the chemical formula $CF_3CH_2OCH_2CH_2OCH_3$ is 3.

The number of the hydrogen atoms included in the fluorinated ether represented by the chemical formula $CF_3CH_2OCH_2CH_2OCH_3$ is 9.

So, the fluorination ratio thereof is calculated as (3/(3+9)), which is equal to 0.25.

As above described, the fluorination ratio of the fluorinated ether represented by the chemical formula $CF_3CH_2OCH_2CH_2OCH_3$ is 0.25.

(Fluorinated Ether)

The fluorinated ether has a fluorination ratio of not more than 60%. The fluorinated ether may have a fluorination ratio of not more than 50%, or not more than 43%. Since the fluorination ratio is not more than 60%, high solubility of the lithium salt is maintained. As a result, the non-aqueous electrolyte has high ion conductivity. Since the fluorinated ether has a fluorine atom, interaction between an ether structure and lithium ions is lowered to allow the charge-discharge reaction on the anode to proceed uniformly. To allow the charge-discharge reaction to further proceed uniformly, the fluorinated ether may have a fluorination ratio of not less than 10%, or not less than 14%.

As long as the fluorinated ether has a fluorine atom in the molecular thereof at a fluorination ratio of not more than 60% and has an ether structure, the chemical structure of the fluorinated ether is not limited. One kind of the fluorinated ether may be used alone. Alternatively, two or more kinds of the fluorinated ethers may be used in combination.

An example of the fluorinated ether is ether represented by the following chemical formula (1).

(1)

where m is an integer of not less than 0.

At least one selected from the group consisting of $R^1$, $R^2$, and $R^3$ has at least one fluorine atom.

$R^1$ may be a hydrocarbon group or an organic group containing a hetero atom. $R^2$ may also be a hydrocarbon group or an organic group containing a hetero atom. An example of the hydrocarbon group is an aliphatic hydrocarbon group such as an alkyl group, an alicyclic hydrocarbon group, or an aromatic hydrocarbon group. An example of the hetero atom contained in the organic group is an oxygen atom, a sulfur atom, a nitrogen atom, or a silicon atom. The organic group may be an aliphatic organic group containing the hetero atom or a heterocycle group containing the hetero atom as an atom which forms the ring.

$R^3$ may be a hydrocarbon group or an alkylene group. The carbon number of the alklylene group is, for example, not less than 1 and not more than 4, not less than 2 and not more than 4, or not less than 2 or not more than 3.

The value of m may be an integer of not less than 0 and not more than 6 or not less than 0 and not more than 3 from the viewpoint of high ion conductivity.

$R^3$ may be an alkylene group having a carbon number of not less than 2 and not more than 4. The carbon number may be not less than 2 and not more than 3, or may be equal to 2.

For the high ion conductivity, the value of m may be an integer of not less than 1 and not more than 6, or not less than 1 and not more than 3.

An example of the hydrocarbon group represented by $R^1$ and $R^2$ are, each independently, an aliphatic hydrocarbon group, an alicyclic hydrocarbon group, or an aromatic hydrocarbon group. Each of the aliphatic hydrocarbon group and the alicyclic hydrocarbon group may be saturated or unsaturated. An example of the aliphatic hydrocarbon group is a saturated aliphatic hydrocarbon group such as alkyl groups or unsaturated aliphatic hydrocarbon group such as an alkenyl group, a dienyl group, or an alkynyl group. The number of the carbon atoms of the saturated aliphatic hydrocarbon group may be not less than 1 and not more than 6, or not less than 1 and not more than 4. The number of the carbon atoms of the unsaturated aliphatic hydrocarbon group may be not less than 2 and not more than 8, or not less than 2 and not more than 6. An example of the alicyclic hydrocarbon group is a saturated alicyclic hydrocarbon group such as a cycloalkyl group or an unsaturated alicyclic hydrocarbon group such as a cycloalkenyl group. The alicyclic hydrocarbon ring may be a cross-linked ring or a condensed ring of an alicyclic hydrocarbon ring and an aromatic ring. The carbon number of the alicyclic hydrocarbon ring may be not less than 4 and not more than 12, or not less than 5 and not more than 8. An example of the aromatic hydrocarbon groups is a phenyl group, a naphthyl group, or a phenanthryl group. The carbon number of the aromatic hydrocarbon group may be not less than 6 and not more than 14, or not less than 6 and not more than 10.

An example of the hetero atom included in $R^1$ and $R^2$ is, each independently, an oxygen atom, a sulfur atom, a nitrogen atom, or a silicon atom. The number of the hetero atom is one. Alternatively, the number of the hetero atoms is two or more. In a case where two or more hetero atoms are included in at least one of $R^1$ and $R^2$, the kinds of the hetero atoms may be different from each other; alternatively, a part of the kinds of the hetero atoms may be the same as each other. The organic group of $R^1$ and $R^2$ each having the hetero atom(s) may be an aliphatic organic group containing the hetero atom. The organic group may be a heterocyclic group in which the hetero atom forms a part of a ring. The heterocyclic group may have an unsaturated bond or may have no unsaturated bond. The heterocyclic group may be aromatic or may have a cross-linked structure.

Typically, the fluorinated ether has a fluorine atom as a first substituent. At least one of $R^1$, $R^2$, and $R^3$ has a fluorine atom. The at least one of $R^1$, $R^2$, and $R^3$ may have a substituent other than a fluorine atom. Hereinafter, such a substituent other than a fluorine atom is referred to as "second substituent". An example of the second substituent is a halogen atom other than a fluorine atom, a hydrocarbon group, or a group containing a hetero atom. The number of the second substituent is one; alternatively, the number of the second substituent is two or more.

In the second substituent, an example of the halogen atom is a chlorine atom, a bromine atom, or an iodine atom.

In the second substituent, an example of the hydrocarbon group is a hydrocarbon group, or an organic group containing a hetero atom, similarly to the case of $R^1$ and $R^2$.

In the second substituent, an example of the organic group containing the hetero atom is a hydroxyl group or a mercapto group.

The fluorinated ether may have two or more kinds of the second substituents which are different from each other.

One example of the fluorinated ether is a compound represented by the following chemical formula (1a). In a case where the compound represented by the following chemical formula (1a) is used, the non-aqueous electrolyte has at least one of high fluidity and high ion conductivity.

(1a)

where $X^1$-$X^4$ represent a hydrogen atom, a fluorine atom, or the second substituent, each independently.

n represents an integer of not less than 1.

At least one of $X^1$-$X^4$, $R^1$, and $R^2$ contains at least one fluorine atom.

$R^1$ and $R^2$ have been already defined in the chemical formula (1).

If the compound represented by the chemical formula (1a) in which the value of n is not less than 1 and not more than 6, the non-aqueous electrolyte has high ion conductivity. If the compound represented by the chemical formula (1a) in which the value of n is not less than 1 and not more than 3, the non-aqueous electrolyte has an appropriate fluidity. The value of n is equal to the value of m.

From the viewpoint of easy introduction of a fluorine atom, at least one of $R^1$ and $R^2$ may have a fluorine atom in the chemical formula (1a). From the viewpoint of high fluidity of the non-aqueous electrolyte, all of $X^1$ to $X^4$ are hydrogen atoms and the value of n is 1 in the chemical formula (1a).

From the viewpoint of availability, $R^1$ and $R^2$ may be alkyl groups, each independently. In this case, at least one of $X^1$-$X^4$ has at least one fluorine atom. In other words, the fluorinated ether may be fluorinated (poly) ethylene glycol dialkylether.

One kind of the fluorinated ether may be used alone. Alternatively, two or more kinds of the fluorinated ether may be used in combination. For example, two or more kinds of the fluorinated ether which are different in the structure or the fluorination ratio thereof may be used in combination.

An example of the fluorinated ether is:

$CF_3CH_2OCH_2CH_2OCH_3$ (fluorination ratio: 25%);

$CF_3CH_2OCH_2CH_2OCH_2CF_3$ (fluorination ratio: 43%);

$CF_3CH_2OCH_2CH_2OCH_2CH_2OCH_2CH_2OCH_2CF_3$ (fluorination ratio: 14%); or $CF_3CH_2OCH(CF_3)CH_2OCH_2CF_3$ (fluorination ratio: 56.3%).

Even in a case where a volume ratio of the fluorinated ether to the solvent is small, the effect according to the ratio is exhibited. The volume ratio of the fluorinated ether may be adjusted depending on the fluorination ratio in the fluorinated ether. In order to allow the charge-discharge reaction to further proceed uniformly, the fluorinated ether may be used as a main solvent. The term "main solvent" means the solvent having the highest volume ratio among two or more kinds of the solvents contained in the non-aqueous electrolyte. In order to allow the charge-discharge reaction to further proceed uniformly, a volume ratio of the fluorinated ether to the solvent may be not less than 50%, not less than 60%, not less than 70%, or not less than 80%. The solvent may be composed only of the fluorinated ether.

In the present embodiment, the volume ratio of the solvent to the entire solvent is a volume ratio at 25 degrees Celsius.

(Other Solvent)

Hereinafter, the fluorinated ether having a fluorination ratio of not more than 60% is referred to as "first solvent". The non-aqueous electrolyte contains not only the first solvent but also a solvent other than the first solvent. Hereinafter, the solvent other than the first solvent is referred to as "second solvent".

The second solvent may be a non-aqueous solvent. An example of the second solvent is ester, ether, nitrile, amide, or the halogen substitution product thereof. The non-aqueous electrolyte may contain one kind of the second solvent; alternatively, the non-aqueous electrolyte may contain two or more kinds of the second solvents. The halogen substitution product thereof has a structure in which at least one hydrogen atom of the second solvent is substituted with a halogen atom. An example of the halogen atom is a fluorine atom, a chlorine atom, a bromine atom, or an iodine atom. Note that the halogen substitution product of ether does not have a fluorine atom and has a chlorine atom, a bromine atom, or an iodine atom.

Another example of the second solvent is a fluorinated ether having a fluorination ratio of more than 60%. In a case where the fluorinated ether having a fluorination ratio of more than 60% is contained in the non-aqueous electrolyte as the second solvent, a volume ratio of the fluorinated ether having a fluorination ratio of more than 60% to the entire solvent may be not more than 5%, or not more than 1%.

An example of the ester is carbonate ester or carboxylate ester.

An example of cyclic carbonate ester is ethylene carbonate, propylene carbonate, butylene carbonate, fluoroethylene carbonate, vinylethylene carbonate, or vinylene carbonate.

An example of chain carbonate ester is dimethyl carbonate, ethyl methyl carbonate, diethyl carbonate, methyl propyl carbonate, ethyl propyl carbonate, or methyl isopropyl carbonate.

An example of cyclic carboxylate ester is γ-butyrolactone or γ-valerolactone.

An example of chain carboxylate ester is methyl acetate, ethyl acetate, propyl acetate, methyl propionate, ethyl propionate, or methyl fluoropropionate.

An example of the ether is cyclic ether or chain ether.

An example of the cyclic ether is 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, or crown ether.

An example of the chain ether is diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxy toluene, benzyl ethyl ether, diphenyl ether, dibenzyl ether, o-dimethoxybenzene, 1,2-dimethoxyethane, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, or tetraethylene glycol dimethyl ether.

An example of the nitrile is acetonitrile, propionitrile, or benzonitrile.

An example of the amide is dimethylformamide or dimethylacetamide.

(Lithium Salt)

As the lithium salt, a publicly known lithium salt which is used for a non-aqueous electrolyte of a lithium secondary battery can be used. An example of the anion of the lithium salt is $BF_4^-$, $ClO_4^-$, $PF_6^-$, $AsF_6^-$, $SbF_6^-$, $AlCl_4^-$, $SCN^-$, $CF_3SO_3^-$, $CF_3CO_2^-$, an anion of imide (namely, an anion represented by $R_aCON^-COR_b$, where $R_a$ and $R_b$ are organic groups, each independently), or an oxalate anion. The non-aqueous electrolyte may contain one kind of the anion selected from these. Alternatively, the non-aqueous electrolyte may contain two or more kinds of the anions selected from these.

An example of the anion of the imide is $N(SO_2C_mF_{2m+1})(SO_2C_nF_{2n+1})$ (where m and n are, each independently, integer of not less than 0). The values of m and n may be not less than 0 and not more than 3, each independently. The values of m and n may be 0, 1, or 2, each independently. An example of the anion of the imide is $N(SO_2CF_3)_2^-$, $N(SO_2C_2F_5)_2^-$, or $N(SO_2F)_2^-$. Hereinafter, $N(SO_2F)_2^-$ is referred to as $FSI^-$. The salt composed of $FSI^-$ and a lithium ion is referred to as LiFSI.

The oxalate anion may include at least one of a boron atom or a phosphorus atom. An example of the oxalate anion is a bis(oxalate)borate anion, $BF_2(C_2O_4)^-$, $PF_4(C_2O_4)^-$, or $PF_2(C_2O_4)_2^-$.

In order to suppress the precipitation of the dendrite formed of the lithium metal, the non-aqueous electrolyte may contain at least one kind selected from the group consisting of the anion of the imide, $PF_6^-$, and the oxalate anion. In a case where the non-aqueous electrolyte contains the oxalate anion, fine particles each formed of a lithium metal are easily precipitated uniformly due to interaction between the oxalate anion and lithium. For this reason, the proceeding of the ununiform charge-discharge reaction due to the local precipitation of the lithium metal is suppressed. To raise the effect that the fine particles each formed of a lithium metal are precipitated uniformly, at least one of the bis(oxalate)borate anion and $BF_2(C_2O_4)^-$ may be used. The oxalate anion may be used in combination with another anion such as $PF_6^-$ or the anion of the imide.

The concentration of the lithium salt in the non-aqueous electrolyte is, for example, not less than 0.5 mol/L, or not less than 1 mol/L. In a case where the concentration of the lithium salt is not less than 0.5 mol/L, the high lithium ion conductivity of the non-aqueous electrolyte may be ensured. The concentration of the lithium salt in the non-aqueous electrolyte may be not less than 2 mol/L, or not less than 3 mol/L. Even in a case where the concentration of the lithium salt is not less than 2 mol/L, the lithium salt is allowed to be easily dissolved in the solvent with the fluorinated ether. On the other hand, the number of solvent molecules solvated to the lithium ions is reduced to allow the charge-discharge reaction to proceed efficiently.

The concentration of the lithium salt is the sum of the concentration of the dissociated lithium salt (i.e., the concentration of the lithium cations) and the concentration of the undissociated lithium salt. The concentration of the anions in the non-aqueous electrolyte may be within the above-mentioned concentration of the lithium salt.

(Others)

The non-aqueous electrolyte may contain an additive. The additive may be decomposed to form a thin film on the anode. The thin film derived from the additive is formed on the anode. In this way, the charge-discharge reaction further proceeds uniformly. Furthermore, the precipitation of the dendrite is easily suppressed. For this reason, the effect of the suppression of the volume change of the anode due to the charge-discharge reaction is further raised to further suppress the decrease in the cycle characteristic. An example of the additive is vinylene carbonate, fluoroethylene carbonate, or vinylethylene carbonate. One kind of the additive may be used alone. Alternatively, two or more kinds of the additives may be used in combination.

(Findings which Established the Foundation of the Present Disclosure)

In the lithium secondary battery, ions contained in the non-aqueous electrolyte receive electrons on the anode during the charge to precipitate a lithium metal. The precipitated lithium metal is dissolved in the non-aqueous electrolyte during the discharge. The precipitation and the dissolution of the lithium metal are conducted during the charge and the discharge, respectively. Since a lithium metal has a significantly high reduction ability, the side reaction of the lithium metal with the non-aqueous electrolyte occurs easily. Except in a full discharge state, the anode of the lithium secondary battery has a lithium metal constantly. For this reason, in the lithium secondary battery, the lithium metal is almost always in contact with the non-aqueous electrolyte compared to a lithium ion battery. So, the side reaction between the lithium metal and the non-aqueous electrolyte is often generated.

In the lithium secondary battery, during the charge, due to at least one of decomposition and reaction of the component contained in the electrolyte, a layer is formed on the anode. The layer is referred to as solid electrolyte interphase layer, which is abbreviated as "SEI layer". The SEI layer may also be formed on the surface of the precipitated lithium metal. During the charge, the SEI layer is formed on the anode, while the lithium metal is precipitated on the anode. This easily causes the thickness of the SEI layer to be ununiform. For this reason, compared to a lithium ion battery, the charge reaction proceeds more ununiformly. This may decreases decrease the capacity and the cycle characteristic. The charge reaction occurs locally to precipitate the dendrite formed of the lithium metal easily. This increases specific surface area to cause the side reaction between the lithium metal and the electrolyte to further proceed. As a result, the discharge capacity is lowered significantly to decrease the cycle characteristic significantly. Furthermore, the dendrite formed of the lithium metal may lower safety of the battery.

In the lithium secondary battery, as above described, since the lithium metal is precipitated and dissolved during the charge and the discharge on the anode, the volume of the anode is varied significantly due to the swelling and shrink of the anode during the charge and the discharge. In case where the anode is swelled to a large extent during the charge, from the effect of stress generated due to the swelling, a clack occurs in the electrode, and/or the electrode is broken. The cycle characteristic may be lowered due to such damage to the electrode.

In a conventional lithium secondary battery, as disclosed in Patent Literature 2, a carbonate is used mainly as the solvent of the non-aqueous electrolyte. Ether may be used. A carbonate is often used as the solvent of the non-aqueous electrolyte in a lithium ion battery. Ether may be added. The present inventors found that the cycle characteristic may be lowered significantly even in a case of using the non-aqueous electrolyte containing a carbonate or an ether for a lithium secondary battery. Patent Literature 1 discloses a lithium ion battery in which a nitrile compound is added to the non-aqueous electrolyte. However, the present inventors also found that the decrease in the cycle characteristic is hardly suppressed even in a case of using the non-aqueous electrolyte containing the nitrile compound in the lithium secondary battery. As just described, the decrease in the cycle characteristic may be hardly suppressed, even in a case of employing, for the lithium secondary battery, the non-aqueous electrolyte which is expected to have an effect of the improvement of the cycle characteristic in the lithium ion battery.

As above described, the conventional lithium secondary battery has a problem that the decrease in the cycle characteristic thereof may be hardly suppressed.

The present inventors produced the lithium secondary battery according to the present disclosure on the basis of the above problem(s).

A lithium secondary battery according to one aspect of the present disclosure comprises a cathode, an anode, a non-aqueous electrolyte having lithium ion conductivity. The lithium metal is precipitated during the charge on the anode, and the lithium metal is dissolved in the non-aqueous electrolyte during the discharge. The non-aqueous electrolyte contains the lithium salt and the solvent. The solvent includes the fluorinated ether having the fluorination ratio of not more than 60%.

In the above aspect, the solvent including the fluorinated ether is used for the non-aqueous electrolyte of the lithium secondary battery. For this reason, although the lithium metal is precipitated on the anode during the charge in the lithium secondary battery, the SEI layer is formed further uniformly to allow the charge-discharge reaction to proceed further uniformly. This suppresses the precipitation of the dendrite formed of the lithium metal and the side reaction between the lithium metal and the non-aqueous electrolyte. As a result, the decrease in the capacity is suppressed to suppress the decrease in the cycle characteristic.

The lowest unoccupied molecular orbital (namely, LUMO) of ether exists at a high energy level. For this reason, ether is hardly reduced to be decomposed, even if ether is brought into contact with a lithium metal, which has a strong reduction ability. Besides, an oxygen atom included in the ether structure strongly interacts with the lithium ions to dissolve the lithium salt easily. From the viewpoint of these behaviors, ether would be suitable for use as the solvent of the non-aqueous electrolyte of the lithium secondary battery. However, ether is actually used as the solvent to cause the charge-discharge reaction to proceed ununiformly. As a result, the cycle characteristic is lowered. The reason therefor would be that the interaction of the ether with the lithium ions is strong excessively to increase the desolvation energy of the ether with regard to the lithium ions. If the desolvation energy of the ether is high, the lithium ions are trapped by the ether molecules, the lithium ions are hardly reduced to be a lithium metal on the surface of the anode as a whole. In such a state, once the lithium metal is precipitated locally on the surface of the anode, the charge reaction would proceed significantly ununiformly in the entire of the anode. For this reason, a part in which the local charge reaction occurs preferentially is generated to vary the thickness of the SEI layer easily. Furthermore, since the lithium metal is precipitated preferentially in the part in which the local charge reaction occurs, the dendrite formed of the lithium metal is easily precipitated. The dendrite formed of the lithium metal causes the side reaction to occur further easily. As a result, the charge-discharge reaction proceeds further ununiformly.

The present inventors found that the interaction between ether and the lithium ions is lowered to allow the charge-discharge reaction to proceed further uniformly in the lithium secondary battery. The fluorinated ether is used to lower the interaction between the oxygen atom(s) included in the ether structure and the lithium ions. The fluorine atom(s) included in the fluorinated ether draw(s) the electrons of the entire of the fluorinated ether due to high electronegativity thereof. The introduction of fluorine atom(s) in the ether lowers the orbital level of an unshared electron pair of the oxygen atom included in the ether structure, which would have interacted with the lithium ions. This loosens overlap between the orbitals to weaken the interaction between the lithium ions and the solvent. In this way, the charge-discharge reaction is allowed to proceed further uniformly on the surface of the anode to suppress the local precipitation of the lithium metal. Furthermore, the precipitation of the dendrite formed of the lithium metal is suppressed. Hence, the side reaction between the lithium metal and the non-aqueous electrolyte is allowed to be suppressed. Since the charge-discharge reaction proceeds further uniformly and the precipitation of the dendrite formed of the lithium metal is suppressed, the volume change of the battery due to the swelling and shrink of the electrode is also suppressed. Therefore, the decrease in the cycle characteristic of the lithium secondary battery is suppressed.

However, in case where the interaction between the fluorinated ether and the lithium ions is too small, the solubility of the lithium salt is lowered to make it difficult to ensure sufficient capacity. As a result, the cycle characteristic is lowered. For this reason, the fluorination ratio of the fluorinated ether is not more than 60%. This suppresses the decrease in the solubility of the lithium salt to ensure the high capacity. As a result, the decrease in the cycle characteristic is suppressed.

(Structure of Lithium Secondary Battery)

The lithium secondary battery comprises a cathode, an anode, and a non-aqueous electrolyte. Typically, a separator is provided between the cathode and the anode. Hereinafter, the structure of the lithium secondary battery will be described with reference to the drawings.

Figure 1A:
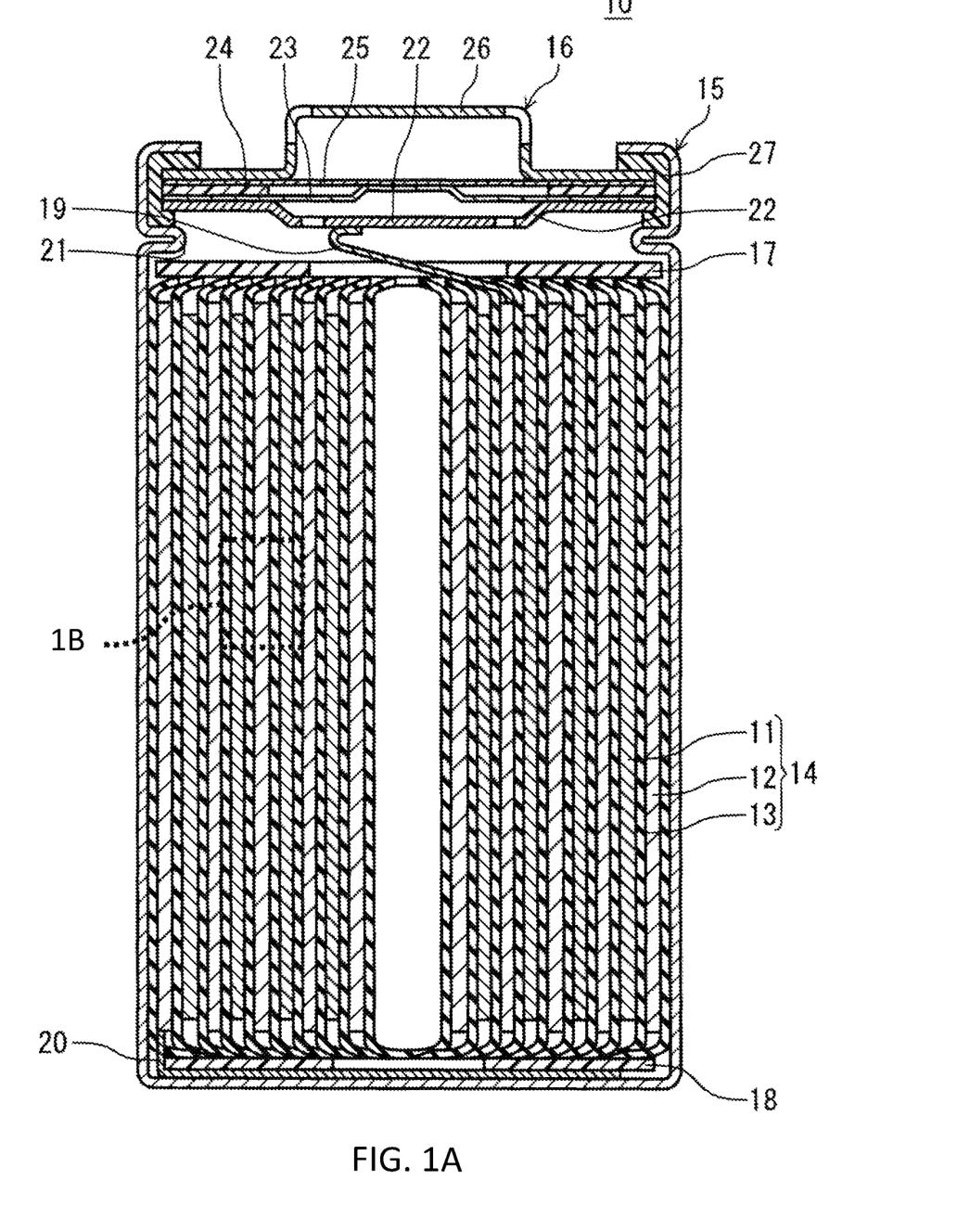
FIG. 1A shows a vertical cross-sectional view of a lithium secondary battery according to the embodiment.
Figure 1B:
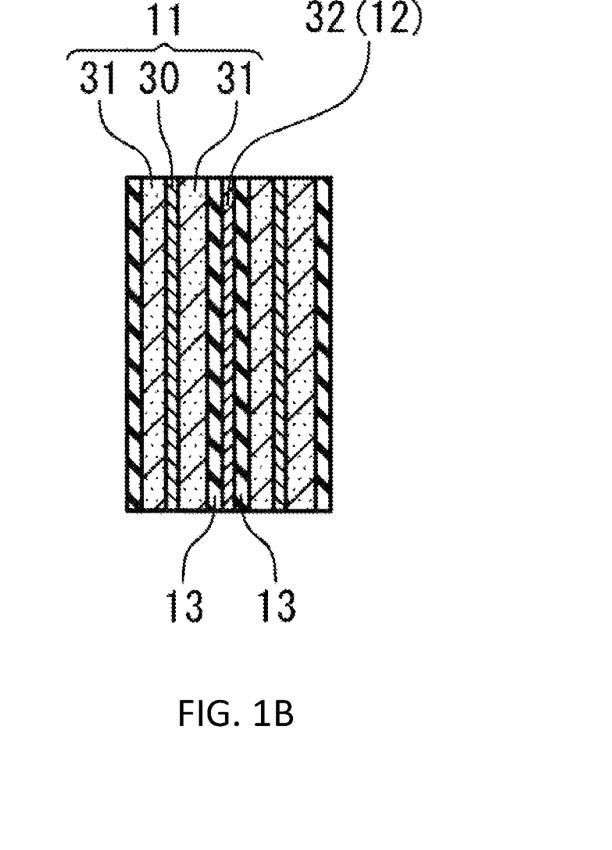
FIG. 1B shows an enlarged cross-sectional view taken along the line 1B included in FIG. 1A in a full discharge state of the lithium secondary battery.

FIG. 1A shows a vertical cross-sectional view of a lithium secondary battery according to the embodiment. FIG. 1B shows an enlarged cross-sectional view taken along the line 1B included in FIG. 1A in a full discharge state of the lithium secondary battery.

The lithium secondary battery 10 is a cylindrical battery comprising a cylindrical battery case, a rolled electrode group 14 stored in the battery case, and a non-aqueous electrolyte (not shown). The battery case comprises a case main body 15 which is a cylindrical metallic container having a bottom and a sealed body 16 which seals an opening of the case main body 15. A gasket 27 is provided between the case main body 15 and the sealed body 16. In this way, the sealability of the battery case is ensured. In the case main body 15, insulation plates 17 and 18 are provided with one and the other lateral surfaces of the rolled electrode group 14, respectively.

The case main body 15 has a recess part 21 formed by partially pressing a lateral surface of the case main body 15 from the outside thereof. The recess part 21 may be formed circularly on the lateral surface along the circumferential direction of the case main body 15. In this case, the sealed body 16 is supported on a surface which faces the opening of the recess part 21.

The sealed body 16 comprises a filter 22, a lower valve body 23, an insulation member 24, an upper valve body 25, and a cap 26. In the sealed body 16, these members are stacked in this order. The sealed body 16 is attached to the opening of the case main body 15 in such a manner that the cap 26 is located on the outside of the case main body 15 and that the filter 22 is located in the inside of the case main body 15. Each of the above-mentioned members included in the sealed body 16 is, for example, cylindrical or ring-shaped. The members except for the insulation member 24 are electrically connected to one another.

The electrode group 14 comprises a cathode 11, an anode 12, and a separator 13. The cathode 11, the anode 12, and the separator 13 are belt-shaped. The cathode 11 and the anode 12 are rolled in a swirl shape in a state where the separator 13 is interposed therebetween in such a manner that the width direction of the belt-shaped cathode 11 and anode 12 are parallel to a rolling axis. In a cross section perpendicular to the rolling axis of the electrode group 14, the cathode 11 and the anode 12 are stacked alternately in a radius direction of the electrode group 14 in a state where the separator 13 is interposed therebetween.

The cathode 11 is electrically connected to the cap 26 which doubles as a cathode terminator through a cathode lead 19. The one end of the cathode lead 19 is electrically connected to the belt-shaped cathode 11. The cathode lead 19 extends from the cathode 11 to the filter 22 through a through hole (not shown) formed in the insulation plate 17. The other end of the cathode lead 19 is welded on a surface of the filter 22 which faces the electrode group 14.

The anode 12 is electrically connected to the case main body 15 which doubles as an anode terminator through an anode lead 20. The one end of the anode lead 20 is electrically connected to the belt-shaped anode 12. The other end of the anode lead 20 is welded on an inner surface of the bottom of the case main body 15.

As shown in FIG. 1B, the cathode 11 comprises a cathode current collector 30 and cathode composite layers 31 provided on the both of surfaces of the cathode current collector 30. The anode 12 comprises an anode current collector 32. On the anode 12 of the lithium secondary battery 10, the lithium metal is precipitated during the charge. On the other hand, the precipitated lithium metal is dissolved in the non-aqueous electrolyte during the discharge.

(Cathode 11)

The cathode 11 comprises, for example, the cathode current collector 30 and the cathode composite layer 31 provided on the cathode current collector 30. The cathode composite layer 31 may be formed on each of the both of the surfaces of the cathode current collector 30. The cathode composite layer 31 may be formed on one of the surfaces of the cathode current collector 30.

The cathode composite layer 31 contains a cathode active material as an essential component. The cathode composite layer 31 may contain an electrical conducting agent, a binder, and an additive. An electrically conductive carbon material may be provided between the cathode current collector 30 and the cathode composite layer 31.

The cathode 11 is provided, for example, by applying a slurry containing a component of the cathode composite layer 31 and a dispersion medium to the surface of the cathode current collector 30, and drying a film, and then, pressing. An example of the dispersion medium is water, an organic medium, or the mixture thereof. The electrically conductive carbon material may be applied on the surface of the cathode current collector 30.

The cathode active material stores and releases the lithium ions. An example of the cathode active material is a lithium-containing transition metal oxide, a transition metal fluoride, a polyanion, a fluorinated polyanion, or a transition metal sulfide. In view of high average discharge voltage and cost reduction, it is desirable that the cathode active material is a lithium-containing transition metal oxide.

An example of a transition metal element included in the lithium-containing transition metal oxide is Sc, Ti, V, Cr, Mn, Fe, Co, Ni, Cu, Y, Zr, or W. The lithium-containing transition metal oxide may contain one kind of the transition metal element. Alternatively, the lithium-containing transition metal oxide may contain two or more kinds of the transition metal elements. The lithium-containing transition metal oxide may contain a typical metal element. An example of the typical metal element is Mg, Al, Ca, Zn, Ga, Ge, Sn, Sb, Pb, or Bi. The lithium-containing transition metal oxide may contain one kind of the typical metal element. Alternatively, the lithium-containing transition metal oxide may contain two or more kinds of the typical metal elements.

A crystal structure of the cathode active material is not limited. An example of the crystal structure of the cathode active material is a crystal structure which belongs to a space group R-3m. The cathode active material having a crystal structure which belongs to the space group R-3m is hardly deteriorated even in the non-aqueous electrolyte. This is because the swelling and shrink of the lattice of the crystal structure which belongs to the space group R-3m due to the charge and discharge is relatively small. As a result, the excellent cycle characteristic is easily provided.

The lithium secondary battery according to the present embodiment may be assembled in a discharged state. The cathode active material having a crystal structure which belongs to the space group R-3m may be an oxide containing at least one selected from the group consisting of Ni, Co, Mn, and Al. In the cathode active material formed of such an oxide, a ratio of the number of atoms of Ni to the total number of atoms of Ni, Co, Mn, and Al may be not less than 0.5. For example, in a case where the cathode active material contains Ni, Co, and Al, the ratio of the number of atoms of Ni may be not less than 0.5 or not less than 0.8. in a case where the cathode active material contains Ni, Co, and Mn, the ratio of the number of atoms of Ni may be not less than 0.5.

An example of the electrical conducting agent is a carbon material. An example of the carbon materials is carbon black, carbon nanotube, or graphite. An example of the carbon black is acetylene black or ketjen black. The cathode composite layer 31 may contain one kind of the electrical conducting agent. Alternatively, the cathode composite layer 31 may contain two or more kinds of the electrical conducting agents. At least one kind selected from these carbon materials may be used as the conductive carbon material provided between the cathode current collector 30 and the cathode composite layer 31.

An example of the binder is fluororesin, polyacrylonitrile, polyimide resin, acrylic resin, polyolefin resin, or rubbery polymer. An example of fluororesin is polytetrafluoroethylene or polyvinylidene fluoride. One kind of the binder may be contained in the cathode composite layer 31. Alternatively, two or more kinds of the binders may be contained in the cathode composite layer 31.

An example of the material of the cathode current collector 30 is a metal such as Al, Ti, Fe or its alloy such as an Al alloy, a Ti alloy, or a Fe alloy. The Fe alloy may be a stainless steel, which is referred to as SUS. An example of the shape of the cathode current collector 30 is a foil or a film. The cathode current collector 30 may be porous. For example, a metal mesh may be used as the cathode current collector 30.

(Anode 12)

In the anode 12 of the lithium secondary battery 10, the lithium metal is precipitated during the charge. In particular, the lithium ions contained in the non-aqueous electrolyte receive electrons on the anode 12 during the charge to become a lithium metal. The lithium metal is precipitated on the anode 12. The lithium metal precipitated on the anode 12 is dissolved as the lithium ions in the non-aqueous electrolyte during the discharge. The lithium ion contained in the non-aqueous electrolyte is at least one lithium ion selected from the group consisting of the lithium ion derived from the lithium salt added to the non-aqueous electrolyte and the lithium ion supplied from the cathode active material during the charge.

The anode 12 comprises an anode current collector 32. Typically, the anode current collector 32 is composed of a conductive sheet. The conductive sheet may be formed of a lithium metal or a lithium alloy. Alternatively, the conductive sheet may be formed of a conductive material other than the lithium metal and the lithium alloy. The conductive material may be a metal material such as a metal or an alloy thereof. The metal material may be a material which does not react with lithium. Such a material may be a material which reacts with neither the lithium metal nor the lithium ions. In particular, such a material may be a material which forms neither an alloy with lithium nor an intermetallic compound with lithium. An example of the metal material is, for example, copper, nickel, iron, an alloy containing these metal elements. An example of the alloy is a copper alloy or SUS. In view of high conductivity, high capacity, and high charge-and-discharge efficiency, the metal material may be copper and/or a copper alloy. The conductive sheet may contain one of these conductive materials. Alternatively, the conductive sheet may contain two or more of these conductive materials.

An example of the conductive sheet is a foil or a film. The conductive sheet may be porous. In view of high conductivity, the conductive sheet may be a metal foil or a metal foil containing copper. Such a metal foil may be a copper foil or a copper alloy foil. The content of copper contained in the metal foil may be not less than 50% by mass or not less than 80% by mass. As the metal foil, in particular, a copper foil containing substantially only copper as the metal element may be used.

In view of high volume energy density, the anode 12 may include only the anode current collector 32 in a full discharge state of the lithium secondary battery. In this case, the anode current collector 32 may be formed of a material which does not react with lithium. In view of high charge and-discharge efficiency, in a full discharge state, the anode may comprise the anode current collector and an anode active material layer which is provided on the surface of the anode current collector. In assembling the battery, only the anode current collector 32 may be used as the anode 12. Alternatively, an anode comprising the anode active material layer and the anode current collector may be used.

An example of the anode active material contained in the anode active material layer is (i) a lithium metal, (ii) a lithium alloy, or (iii) a material capable of reversibly storing and releasing the lithium ions. An example of the lithium alloy is a lithium-aluminum alloy. An example of the materials capable of reversibly storing and releasing the lithium ions is a carbon material or an alloy material. An example of the carbon material is a graphite material, soft carbon, hard carbon, or amorphous carbon. An example of the alloy material is a material containing silicon or tin. An example of the material containing silicon is elemental silicon, a silicon alloy, or a silicon compound. An example of the material containing tin is elemental tin, a tin alloy, or a tin compound. An example of the silicon compound is a silicon oxide or a silicon nitride. An example of the tin compound is a tin oxide or a tin nitride.

The anode active material layer may be formed by depositing the anode active material on the surface of the anode current collector by a gas-phase method such as electrodeposition or vapor deposition. The anode active material layer may be formed by coating an anode composition containing the anode active material and the binder on the surface of the anode current collector. The anode composition may contain at least one of the electrical conducting agent, the thickener, and the additive, if necessary.

The thickness of the anode active material layer is not limited. The thickness of the anode active material layer is, for example, not less than 30 micrometers and not more than 300 micrometers in the full discharge state of the lithium secondary battery. The thickness of the anode current collector 32 is, for example, not less than 5 micrometers and not more than 20 micrometers.

In the present specification, the full discharge state of the lithium secondary battery means a state where the lithium secondary battery is discharged until a state of charge reaches not more than 0.05×C, where the rated capacity of the battery is C. "State of charge" is referred to as "SOC". For example, the full discharge state of the lithium secondary battery means a state in which the lithium secondary battery is discharged to the lower limit voltage at a constant current of 0.05 C. An example of the lower limit voltage is 2.5 volts.

The anode 12 may further include a protective layer. The protective layer may be formed on the surface of the anode current collector 32. In a case where the anode 12 has the anode active material layer, the protective layer may be formed on the surface of the anode active material layer. The protective layer has the effect of allowing the surface reaction of the electrode to be more uniform. The protective layer facilitates the more uniform precipitation of the lithium metal on the anode. The protective layer is composed of, for example, at least one selected from the group consisting of an organic substance and an inorganic substance. As a material of the protective layer, a material which does not inhibit the lithium ion conductivity is selected. An example of the organic substance is a polymer having the lithium ion conductivity. An example of such a polymer is polyethylene oxide or polymethyl methacrylate. An example of the inorganic substance is a ceramic or a solid electrolyte. An example of the ceramic is $SiO_2$, $Al_2O_3$, or $MgO$.

The material of the solid electrolyte included in the protective layer is not limited. An example of the material of the solid electrolyte included in the protective layer is a sulfide solid electrolyte, a phosphate solid electrolyte, a perovskite solid electrolyte, or a garnet solid electrolyte. In view of low cost and easy availability, it is desirable that the solid electrolyte is a sulfide solid electrolyte or a phosphate solid electrolyte.

The sulfide solid electrolyte contains a sulfur component and has lithium ion conductivity. The sulfide solid electrolyte may contain, for example, S, Li, and a third element. An example of the third element is at least one selected from the group consisting of P, Ge, B, Si, I, Al, Ga, and As. An example of the material of the sulfide solid electrolyte is $Li_2S$—$P_2S_5$, $70Li_2S$-$30P_2S_5$, $80Li_2S$-$20P_2S_5$, $Li_2S$—$SiS_2$, or $LiGe_{0.25}P_{0.75}S_4$.

The phosphate solid electrolyte contains a phosphoric acid component and has lithium ion conductivity. An example of the material of the phosphate solid electrolyte is $Li_{1+X}Al_XTi_{2-X}(PO_4)_3$ (0<x<2, for example, $Li_{1.5}Al_{0.5}Ti_{1.5}(PO_4)_3$) or $Li_{1+X}Al_XGe_{2-X}(PO_4)_3$. The value of X may be not more than 1.

(Separator 13)

As the separator 13, a porous sheet having ion permeability and an insulating property is used. An example of the porous sheet is a microporous film, a woven fabric, or a non-woven fabric. The material of the separator is not limited. An example of the material of the separator is a polymer material. An example of the polymer material is olefin resin, polyamide resin, or cellulose. An example of the olefin resin is (i) polyethylene, (ii) polypropylene, or (iii) an olefin copolymer containing at least one of ethylene and propylene as a monomer unit. The separator 13 may contain an additive. An example of the additive is an inorganic filler.

The separator 13 may be a stacking structure. An example of the stacking structure is (i) a stacking structure of a polyethylene microporous film and a polypropylene microporous film, or (ii) a stacking structure of a non-woven fabric containing cellulose fibers and a non-woven fabric containing thermoplastic resin fibers. Another example of the stacking structure is a stacking structure in which a coating film formed of polyamide resin is stacked on the surface of a microporous film, a woven fabric, or a non-woven fabric. Since such a separator 13 has high durability, damage of the separator 13 is suppressed even if pressure is applied to the separator 13 in a state where the separator 13 is in contact with the plurality of protrusion portions. In view of at least one selected from the group consisting of heat resistance and strength, the separator 13 may comprise layers each containing an inorganic filler on the surfaces which face the cathode 11 and the anode 12.

(Others)

In FIG. 1A, the lithium secondary battery is a cylindrical lithium secondary battery including the cylindrical battery case. However, the lithium secondary battery according to the present disclosure is not limited to the lithium secondary battery shown in FIG. 1A. The lithium secondary battery according to the present disclosure may be, for example, a prismatic battery comprising a prismatic battery case. The lithium secondary battery according to the present disclosure may be a laminate battery comprising a resin outer casing such as an aluminum laminate sheet. The electrode group does not have to be rolled. The electrode group may be, for example, a laminated electrode group in which a plurality of the cathode layers and a plurality of the anode layers are alternately stacked in such a manner that the separator is interposed between each of the cathode layers and each of the anode layers.

In the lithium secondary battery comprising the rolled electrode group, the crack may occur in the electrode or the electrode may be broken, due to the stress generated by the swelling of the anode during the charge. The thickness of the electrode of the lithium secondary battery comprising the laminated electrode group significantly increases due to the large swelling of the anode during the charge. However, in the lithium secondary battery according to the present disclosure, since the above-mentioned non-aqueous electrolyte is used, the swelling of the anode is suppressed. Therefore, in any case of using the rolled electrode group and the laminated electrode group, the deterioration of the battery characteristics (i.e., the cycle characteristic) due to the swelling of the anode is suppressed.

EXAMPLES

Hereinafter, the lithium secondary battery according to the present disclosure will be described in more detail with reference to the following inventive examples and comparative examples.

Inventive Examples 1-5 and 9 and Comparative Examples 1-7

The lithium secondary battery having the structure shown in FIG. 1A was produced by the following procedure.

(1) Production of the Cathode 11

The cathode active material, acetylene black, and polyvinylidene fluoride were mixed at a mass ratio of 95:2.5:2.5 to provide a mixture. Acetylene black and polyvinylidene fluoride were served as the electrical conducting agent and the binder. An appropriate amount of N-methyl-2-pyrrolidone was added as the dispersion medium to the mixture, and then, the mixture was stirred to prepare a cathode composition slurry. As the cathode active material, a lithium-containing transition metal oxide containing Ni, Co and Al and having a crystal structure which belonged to the space group R-3m was used.

The cathode composition slurry was applied to both of the surfaces of an aluminum foil used as the cathode current collector 30, and then dried. In this way, a stacking structure was provided. The stacking structure was pressed with a roller in the thickness direction thereof. The thus-pressed stacking structure was cut into a predetermined electrode size to produce the cathode 11 comprising the cathode composite layers 31 provided on the both of the surfaces of the cathode current collector 30. An exposing part of the cathode current collector 30 which did not have the cathode composite layer 31 was formed at a region of a part of the cathode 11. One end of the cathode lead 19 formed of aluminum was welded onto the exposing part of the cathode current collector 30.

(2) Production of the Anode 12

An electrolytic copper foil having a thickness of 10 micrometers was cut into a predetermined electrode size to produce the anode current collector 32. The anode current collector 32 was used as the production of the battery as the anode 12. One end of the anode lead 20 formed of nickel was welded to the anode current collector 32.

(3) Preparation of the Non-Aqueous Electrolyte

Lithium salts were dissolved to the solvent as shown in Table 1. In this way, a liquid non-aqueous electrolyte was prepared.

The solvents and the lithium salts shown in Table 1 will be listed as below.

(a) Fluorinated ether 1: $CF_3CH_2OCH_2CH_2OCH_3$ (fluorination ratio: 25%)

(b) Fluorinated ether 2: $CF_3CH_2OCH_2CH_2OCH_2CF_3$ (fluorination ratio: 43%)

(c) Fluorinated ether 3: $CF_3CH_2OCH_2CH_2OCH_2CH_2OCH_2CH_2OCH_2CF_3$ (fluorination ratio: 14%)

(d) Fluorinated ether 4: $CF_3CH_2OCF_2CHF_2$ (fluorination ratio: 70%)

(e) Fluorinated ether 5: $CF_3CH_2OCH(CF_3)CH_2OCH_2CF_3$ (fluorination ratio: 56.3%)

(f) DME: 1,2-dimethoxyethane represented by the chemical formula $CH_3OCH_2CH_2OCH_3$ (fluorination ratio: 0%)

(g) DMC: Dimethyl carbonate represented by the chemical formula $CH_3OC(=O)OCH_3$ (fluorination ratio: 0%)

(h) MFMA: Monofluoromethyl acetate represented by the chemical formula $CH_3C(=O)OCH_2F$ (fluorination ratio: 17%)

(i) TFPN: Trifluoropropionitrile represented by the chemical formula $CF_3CH_2CN$ (fluorination ratio: 60%)

(j) DFPN: Difluoropropionitrile represented by the chemical formula $CHF_2CH_2CN$ (fluorination ratio: 40%)

(k) LiFSI: Lithium bis(fluorosulfonyl)imide represented by the chemical formula $Li^+[FSO_2N^-SO_2F]$ (4) Production of the Battery The cathode 11 provided in the section (1), a microporous film formed of polyethylene (i.e., the separator 13), and the anode 12 provided in the section (2) were stacked in this order in an inert gas atmosphere to provide a stacking structure. The thus-provided stacking structure was rolled in a swirl shape to provide the electrode group 14. The provided electrode group 14 was stored in a bag-shaped outer casing formed of a laminated sheet comprising an Al layer. Then, the non-aqueous electrolyte was poured into the outer casing, and then, the outer casing was sealed. In this way, the lithium secondary battery was produced.

(5) Evaluation

The discharge capacity and the cycle characteristic of the lithium secondary batteries according to the inventive examples and the comparative examples were evaluated on the basis of the charge-discharge test performed by the following procedure.

First, the lithium secondary battery was charged under the following condition in a thermostat bath maintained at 25 degrees Celsius, and then, the lithium secondary battery was left at rest for 20 minutes. Subsequently, the lithium secondary battery was discharged under the following condition.

(Charge)

The lithium secondary battery was charged at a constant current of 0.1 It until the battery voltage of the battery reached 4.1 volts. Then, the lithium secondary battery was charged at a constant voltage of 4.1 volts until the current value reached 0.01 It.

(Discharge)

The lithium secondary battery was discharged at a constant current of 0.1 It until the battery voltage reached 2.5 volts.

The charge-and-discharge was repeated 10 times (i.e., 10 cycles). One cycle is composed of a single charge and a single discharge. The discharge capacity at the first cycle was measured as the first discharge capacity. The discharge capacity at the tenth cycle was measured as the final discharge capacity. The ratio of the final discharge capacity to the first discharge capacity was calculated as a capacity maintenance ratio (%), which is used as an index of the cycle characteristic.

The following Table 1 shows the results of the inventive examples 1-5 and 9 and the comparative examples 1-7. In Table 1, T1-T5, T9, and R1-R7 mean the inventive examples 1-5, the inventive example 9, and the comparative examples 1-7, respectively.

where the fluorination ratio is more than 60%, since the lithium salt is dissolved insufficiently, the battery was neither charged nor discharged successfully. In R1, the fluorination ratio is 0%. Although the first discharge capacity in R1 is the same as that of T5 (fluorination ratio: 14%), the cycle characteristic in R1 is significantly lower than that of T5. The reason therefor would be that the solvation to the lithium ion in R1 is larger than those of the inventive examples, and that, as a result, the charge-discharge reaction proceeds ununiformly. In R4, the carbonate having a fluorination ratio is 0% is used. Both of the first discharge capacity and the cycle characteristic in R4 are significantly lower than those of the inventive examples.

As shown in R5-R7, even in a case where a fluorine-containing solvent having a fluorination ratio of not more than 60% is used, in case where the fluorine-containing solvent is not ether, although the high first discharge capacity is provided, the capacity maintenance ratio is significantly low. In particular, the fluorinated nitrile is used in R6 and R7. In R6 and R7, the capacity maintenance ratio is 0% after 10 cycles, regardless of the fluorination ratio.

The above results reveal that the use of the fluorinated ether having a fluorination ratio of not more than 60% as the solvent of the non-aqueous electrolyte has a significant influence to the suppression of the decrease in the cycle characteristic of the lithium secondary battery.

As is clear from the respective comparison of T1 and T3 to T2 and T4, in a case where the concentration of the lithium salt contained in the non-aqueous electrolyte is not less than 3.0 mol/L, the significantly high capacity maintenance ratio of more than 99% is provided. In order to further suppress the decrease in the cycle characteristic, the concentration of the lithium salt may be not less than 2.5 mol/L, or not less than 3 mol/L.

TABLE 1

| | Solvent | | Lithium salt | | first | capacity |
|---|---|---|---|---|---|---|
| Kind | Classification | Fluorination Ratio (%) | Kind | Conc. (mol/L) | discharge capacity (mAh/g) | maintenance ratio (%) |
| R1 | DME | Ether | 0 | LiFSI | 1.0 | 129 | 83.0 |
| T5 | Fluorinated Ether 3 | Ether | 14 | LiFSI | 1.0 | 130 | 96.1 |
| T1 | Fluorinated Ether 1 | Ether | 25 | LiFSI | 1.0 | 140 | 98.8 |
| | | | | LiBF$_2$(C$_2$O$_4$) | 0.5 | | |
| T2 | Fluorinated Ether 1 | Ether | 25 | LiFSI | 3.0 | 144 | 99.3 |
| | | | | LiBF$_2$(C$_2$O$_4$) | 0.5 | | |
| T3 | Fluorinated Ether 2 | Ether | 43 | LiFSI | 1.0 | 134 | 97.2 |
| T4 | Fluorinated Ether 2 | Ether | 43 | LiFSI | 3.0 | 134 | 99.5 |
| T9 | Fluorinated Ether 5 | Ether | 56.3 | LiFSI | 1.0 | 133 | 97.0 |
| R2 | Fluorinated Ether 4 | Ether | 70 | LiFSI | 1.0 | Not chargeable/dischargeable | |
| R3 | Fluorinated Ether 4 | Ether | 70 | LiFSI | 3.0 | Not chargeable/dischargeable | |
| R4 | DMC | Carbonate | 0 | LiFSI | 1.0 | 53 | 9.0 |
| R5 | MFMA | Ester | 17 | LiFSI | 1.0 | 147 | 75.0 |
| R6 | TFPN | Nitrile | 60 | LiFSI | 1.0 | 139 | 0.0 |
| R7 | DFPN | Nitrile | 40 | LiFSI | 1.0 | 138 | 0.0 |

As shown in the inventive examples 1-5 and 9 in Table 1, high first discharge capacity is provided by using the fluorinated ether having a fluorination ratio of not more than approximately 60% in the non-aqueous electrolyte. As is clear from the capacity maintenance ratio included in Table 1, even after 10 cycles, the high discharge capacity is maintained and the excellent cycle characteristic is provided.

On the other hand, even in a case where the fluorinated ether is used as a solvent, as shown in R2 and R3, in case Inventive Examples 6-8 and 10-15 and Comparative Example 8

An experiment similar to the inventive example 1 was conducted, except that the non-aqueous electrolyte was prepared as shown in Table 2.

The term "FEC" in Table 2 means fluoroethylene carbonate represented by the chemical formula $C_3H_3FO_3$ (fluorination ratio: 25%).

FEC and DME were used as the second solvent.

Table 2 and Table 3 show the results of the inventive examples 6-15 and the comparative example 8. In Table 2, T6-T15 and R8 mean the inventive examples 6-15 and the comparative example 8, respectively.

TABLE 2

| | Solvent | | | |
|---|---|---|---|---|
| | Kind | Classification | Fluorination Ratio (%) | Volume Ratio in Solvent |
| R1 | DME | Ether | 0 | 100 |
| T2 | Fluorinated Ether 1 | Ether | 25 | 100 |
| T6 | Fluorinated Ether 1 | Ether | 25 | 80 |
| | FEC | Carbonate | 25 | 20 |
| T7 | Fluorinated Ether 1 | Ether | 25 | 60 |
| | FEC | Carbonate | 25 | 40 |
| T8 | Fluorinated Ether 1 | Ether | 25 | 50 |
| | FEC | Carbonate | 25 | 50 |
| T10 | Fluorinated Ether 5 | Ether | 56.3 | 80 |
| | FEC | Carbonate | 25 | 20 |
| T11 | Fluorinated Ether 1 | Ether | 25 | 80 |
| | DME | Ether | 0 | 20 |
| T12 | Fluorinated Ether 1 | Ether | 25 | 60 |
| | DME | Ether | 0 | 40 |
| T13 | Fluorinated Ether 1 | Ether | 25 | 40 |
| | DME | Ether | 0 | 60 |
| T14 | Fluorinated Ether 1 | Ether | 25 | 20 |
| | DME | Ether | 0 | 80 |
| T15 | Fluorinated Ether 1 | Ether | 25 | 40 |
| | FEC | Carbonate | 25 | 60 |
| R8 | Fluorinated Ether 4 | Ether | 70 | 80 |
| | FEC | Carbonate | 25 | 20 |
| R3 | Fluorinated Ether 4 | Ether | 70 | 100 |

TABLE 3

| | Lithium Salt | | first discharge capacity (mAh/g) | capacity maintenance ratio (%) |
|---|---|---|---|---|
| | Kind | Concentration (mol/L) | | |
| R1 | LiFSI | 1.0 | 129 | 83.0 |
| T2 | LiFSI | 3.0 | 144 | 99.3 |
| | LiBF$_2$(C$_2$O$_4$) | 0.5 | | |
| T6 | LiFSI | 3.0 | 136 | 95.6 |
| | LiBF$_2$(C$_2$O$_4$) | 0.5 | | |
| T7 | LiFSI | 3.0 | 135 | 95.2 |
| | LiBF$_2$(C$_2$O$_4$) | 0.5 | | |
| T8 | LiFSI | 3.0 | 135 | 95.1 |
| | LiBF$_2$(C$_2$O$_4$) | 0.5 | | |
| T10 | LiFSI | 3.0 | 133 | 95.5 |
| | LiBF$_2$(C$_2$O$_4$) | 0.5 | | |
| T11 | LiFSI | 1.0 | 140 | 98.5 |
| | LiBF$_2$(C$_2$O$_4$) | 0.5 | | |
| T12 | LiFSI | 1.0 | 137 | 96.8 |
| | LiBF$_2$(C$_2$O$_4$) | 0.5 | | |
| T13 | LiFSI | 1.0 | 135 | 91.1 |
| | LiBF$_2$(C$_2$O$_4$) | 0.5 | | |
| T14 | LiFSI | 1.0 | 132 | 88.0 |
| | LiBF$_2$(C$_2$O$_4$) | 0.5 | | |
| T15 | LiFSI | 3.0 | 136 | 82.1 |
| | LiBF$_2$(C$_2$O$_4$) | 0.5 | | |
| R8 | LiFSI | 3.0 | Not chargeable/dischargeable | |
| | LiBF$_2$(C$_2$O$_4$) | 0.5 | | |
| R3 | LiFSI | 3.0 | Not chargeable/dischargeable | |

As shown in Table 2 and Table 3, the lithium secondary battery comprising the non-aqueous electrolyte containing not only the fluorinated ether (i.e., the first solvent) but also another solvent (i.e., the second solvent) also has the high first discharge capacity and higher cycle characteristic than R1. In T6, T7, T8, and T10, the mixture solvent of the fluorinated ether and FEC is used. As is clear from T6, T7, T8, and T10, if the volume ratio of the fluorinated ether is not less than 50%, both the first discharge capacity and the capacity maintenance ratio are high. In T10, the fluorinated ether 5 having a fluorination ratio of 56.3% is used. Also in T10, both the first discharge capacity and the capacity maintenance ratio are high. In T11-T15, the mixture solvent of the fluorinated ether and FEC (or DME) is used. If the fluorinated ether has a fluorination ratio of not more than 60%, both the first discharge capacity and the capacity maintenance ratio would be high, similarly to the cases of T2, T6-T8, and T10-T15, even if the non-aqueous electrolyte contains not only the fluorinated ether but also the second solvent.

Both the first discharge capacity and the capacity maintenance ratio are lowered with a decrease in the volume ratio of the fluorinated ether contained in the mixture solvent. In R8, the fluorinated ether 4 having a fluorination ratio of 70% is used. Although the fluorinated ether 4 is used with FEC in R8, the battery in R8 is neither charged nor discharged successfully, similarly to the case where the fluorinated ether 4 is used alone (see R3).

INDUSTRIAL APPLICABILITY

The lithium secondary battery according to the present disclosure has an excellent cycle characteristic. The lithium secondary battery according to the present disclosure is useful for various uses such as (i) an electronic device such as a mobile phone, a smartphone, or a tablet terminal, (ii) an electric vehicle including a hybrid or a plug-in hybrid, or (iii) a household storage battery which is combined with a solar cell.

REFERENTIAL SIGNS LIST

10 Lithium secondary battery
11 Cathode
12 Anode
13 Separator
14 Electrode group
15 Case main body
16 Sealed body
17 Insulation plate
18 Insulation plate
19 Cathode lead
20 Anode lead
21 Recess part
22 Filter
23 Lower valve body
24 Insulation member
25 Upper valve body
26 Cap
27 Gasket
30 Cathode current collector
31 Cathode composite layer
32 Anode current collector

The invention claimed is:

1. A lithium secondary battery, comprising: a cathode; an anode; and a non-aqueous electrolyte having lithium ion conductivity, wherein: a lithium metal is precipitated on a surface of the anode during charge of the lithium secondary battery, the lithium metal is dissolved from the surface of the anode in the non-aqueous electrolyte during discharge of the lithium secondary battery, the non-aqueous electrolyte contains a solvent and a lithium salt, the solvent includes a fluorinated ether, and the fluorinated ether is represented by the following chemical formula:

where: n represents an integer of not less than 1, $R^1$ is $CF_3CH_2$—, $R^2$ is —$CH_3$ or —$CH_2CF_3$, and $X^1$-$X^4$ each are, independently, a hydrogen atom, a fluorine atom, or —$CF_3$, $X^1$-$X^4$ are not simultaneously a hydrogen atom, the fluorinated ether has a fluorination ratio of not less than 14% and not more than 60%, wherein a volume ratio of the fluorinated ether to the solvent is not less than 50%, and wherein the lithium salt contained in the non-aqueous electrolyte has a concentration of not less than 3 mol/L.

2. The lithium secondary battery according to claim 1, wherein a volume ratio of the fluorinated ether to the solvent is not less than 60%.

3. The lithium secondary battery according to claim 1, wherein the fluorination ratio is not more than 50%.

4. The lithium secondary battery according to claim 1, wherein the fluorination ratio is not more than 43%.

5. The lithium secondary battery according to claim 1, wherein:
the lithium salt is composed of a lithium ion and an anion, and
the anion is at least one selected from the group consisting of an anion of imide, $PF_6$, and an oxalate anion.

6. The lithium secondary battery according to claim 1, wherein
the cathode comprises a cathode active material having a crystal structure which belongs to a space group R-3m.

* * * * *